United States Patent [19]
Bartlett

[11] Patent Number: 5,030,385
[45] Date of Patent: Jul. 9, 1991

[54] PROCESS OF INHIBITING CORROSION

[75] Inventor: Philip L. Bartlett, Wilmington, Del.

[73] Assignee: E. I. Du Pont de Nemours and Company, Wilmington, Del.

[21] Appl. No.: 408,397

[22] Filed: Sep. 18, 1989

Related U.S. Application Data

[60] Continuation-in-part of Ser. No. 174,497, Mar. 25, 1988, abandoned, which is a division of Ser. No. 819,117, Jan. 15, 1986, abandoned.

[51] Int. Cl.$^5$ ............ C23F 11/02; C23F 11/10; A01N 25/06; A61K 9/12
[52] U.S. Cl. ............ 252/392; 422/9; 106/14.16; 106/14.18; 427/388.4; 424/44; 424/405; 424/43
[58] Field of Search ............ 422/9; 252/392; 106/14.16, 14.18; 427/388.4; 424/405, 44, 43, 76.2

[56] References Cited

U.S. PATENT DOCUMENTS

| | | | |
|---|---|---|---|
| 1,810,946 | 6/1931 | Calcott et al. | 252/392 X |
| 2,060,138 | 11/1936 | Taylor | 252/5 |
| 2,401,993 | 6/1946 | Wasson et al. | 252/34 |
| 2,577,219 | 12/1951 | Wachter et al. | 422/9 |
| 2,629,649 | 2/1953 | Wachter et al. | 252/392 |
| 2,739,871 | 3/1956 | Senkus | 21/2.5 |
| 2,907,646 | 10/1959 | O'Kelly | 44/63 |
| 2,935,389 | 5/1960 | Titsworth et al. | 252/392 X |
| 3,469,955 | 9/1969 | Grosse-Oetringhaus | 44/63 |
| 3,660,334 | 5/1972 | Apikos | 524/219 |
| 3,758,493 | 9/1973 | Maddox | 260/309.7 |
| 3,866,800 | 2/1975 | Schmitt | 424/44 X |
| 4,052,322 | 10/1977 | Crookshank | 252/18 |
| 4,101,328 | 7/1978 | Fleser et al. | 428/624 |
| 4,126,628 | 11/1978 | Paquet | 260/404.5 A |
| 4,161,458 | 7/1979 | Kolleth | 424/44 X |
| 4,195,977 | 4/1980 | Newman | 44/71 |
| 4,315,910 | 2/1982 | Nowak et al. | 425/47 |
| 4,595,523 | 6/1986 | Knepper et al. | 252/390 |
| 4,600,530 | 7/1986 | Bartlett | 252/392 |
| 4,602,958 | 7/1986 | Bartlett | 252/392 X |
| 4,668,507 | 5/1987 | Tomkins et al. | 252/389.2 |

FOREIGN PATENT DOCUMENTS

| | | | |
|---|---|---|---|
| 2146328 | 9/1971 | Fed. Rep. of Germany | |
| 2146382 | 3/1973 | Fed. Rep. of Germany | 252/392 |
| 45-27692 | 1/1970 | Japan | 12/82 |
| 56-82869 | 7/1981 | Japan | 3/30 |
| 82869 | 7/1981 | Japan | 252/392 |
| 82870 | 7/1981 | Japan | 252/392 |
| 64398 | 4/1983 | Japan | 252/390 |
| 533593 | 2/1977 | U.S.S.R. | |

OTHER PUBLICATIONS

Chemical Abstract No. 109102/69, Kawai, Akio; Kato, Voichi (Japan) Aichi-Ken Kogyo Shidosho Hokoku 1966 (1), 43–6 (Japan).
Kogyo Kagaku Zasshi 64, No. 5:902–6 (1961); Studies on Anticorrosives, Effect of Imidazoline Compounds Inhibiting Corrosion; T. Baba and T. Yoshroz.
Patent Abstracts of Japan, vol. 9, No. 192 (Aug. 8, 1985) Publication 60-63278.
Derwent Abstract, No. 120575 (1971), "Corrosion Inhibitor Protecting Metals . . . ".
Chem. Abstract, No. 109108, vol. 69 (1968) p. 10238, "Oil Stain on Mild Steel . . . ".
Chem. Abstract, No. 109102, vol. 69 (1968) p. 10237, "Oil Staining Phenomenon . . . ".
Chem. Abstract, vol. 101677, vol. 67 (1967) p. 9592, "Protective Agents Against Corrosion".

Primary Examiner—Deborah L. Kyle
Assistant Examiner—Valerie Fee

[57] ABSTRACT

A process is disclosed for inhibiting corrosion in tin-plated steel aerosol cans which contain aqueous aerosol formulations and a propellant. Compositions such as the isopropylamine, cyclohexylamine, 2-ethylhexylamine and tertiary $C_{12-14}$ alkyl primary amine salts of N-acyl sarcosine; morpholine salts of oleic acid, acetic acid, benzoic acid, and N-acyl sarcosine; cyclohexylamine, 2-ethylhexylamine, tertiary $C_{12-14}$ alkyl primary amine and tertiary $C_{18-22}$ alkyl primary amine salts of benzoic acid are disclosed.

9 Claims, No Drawings

PROCESS OF INHIBITING CORROSION

CROSS REFERENCE TO RELATED APPLICATIONS

This application is a continuation-in-part of copending application Ser. No. 07/174,497, now abandoned filed Mar. 25, 1988, which was a divisional of application Ser. No. 819,117, filed Jan. 15, 1986, now abandoned.

BACKGROUND OF THE INVENTION

This invention relates to corrosion inhibitor compositions and a process of inhibiting corrosion in aerosol products.

Many products designed for household, personal, automotive and other types of use are available as aerosol products. Examples of such aerosol products include: personal products such as hair care products (sprays, coloring agents and styling/conditioning mousses), deodorants, antiperspirants, first aid sprays, and colognes; household products such as waxes, polishes, pan sprays, insecticides and room fresheners; automotive products such as cleaners and polishes; industrial products such as cleaners, lubricants and mold release agents; and animal care products such as tick and flea repellants.

Although some aerosol products are packaged in glass bottles or aluminum cans or lined steel cans, most formulations are packaged in unlined cans made of tin-plated steel which may corrode during storage or use. While the tin affords some protection against corrosion, the thinness of the coating, imperfections in the surface, wear and tear, and chemical action may ultimately expose the steel to the contents of the can, and allow corrosion to occur. This corrosion can lead to contamination of the aerosol product and ultimately to the rupture of the can, if the corrosion is severe enough.

Water based aerosol formulations are being used increasingly to lower the flammability of the aerosol propellant and reduce manufacturing costs. However, the presence of water in an aerosol formulation increases the possibility of corrosion of tin-plated steel cans.

Usually a packaged aerosol contains both liquid and vapor phases and corrosion can occur on the interior surface of the can which is in contact with either phase. In addition, corrosion is more likely to occur when more than 80 ppm (parts per million) water is present. For example, in a system that includes dimethyl ether, a propellant and water, corrosion of the can which is in contact with the vapor phase may be aggravated by the fact that relatively large amounts of water vapor are present with the propellant; for example, the vapor phase of a 95/5 wt. % dimethyl ether/water system contains 7,750 ppm water vapor at 70° F. (21.1° C.). Moreover, the addition of ethanol to a DME/water system will often increase the amount of water vapor in the vapor phase and exacerbate the problem of vapor phase corrosion; a 90/5/5 (wt. %) DME/ethanol/water system will contain 9,100 ppm water vapor at 70° F.

Corrosion inhibitors are therefore useful when water-based aerosol formulations are packaged in tin-plated steel cans. However, many commercially available corrosion inhibitors are either ineffective for aerosol systems containing water or they fail to provide adequate protection against both liquid phase and vapor phase corrosion. It often happens that a corrosion inhibitor provides good liquid phase protection but fails to provide effective vapor phase protection. The reverse can also occur.

SUMMARY OF THE INVENTION

In accordance with this invention it has been found that corrosion of the interior of tin-plated steel containers which contain water-based aerosol formulations can be effectively controlled by the presence of an effective amount of a compound selected from the group consisting of $C_3$ to $C_{14}$ alkyl amine salts of N-acyl sarcosine, $C_4$ to $C_{22}$ alkyl amine salts of benzoic acid, $C_4$ to $C_{22}$ alkyl amine salts of oleic acid, salts of polyamines and oleic acid, and salts of imidazolines and oleic acid.

A process of inhibiting corrosion in a tin-plated steel aerosol can containing an aqueous aerosol formulation and a propellant comprising contacting the aqueous aerosol formulation, the propellant and an effective amount of a compound selected from the group consisting of $C_4$ to $C_{22}$ alkyl amine salts of oleic acid, and salts of polyamines and oleic acid, and salts of imidazolines and oleic acid with the interior of a tin-plated steel aerosol can.

DETAILED DESCRIPTION OF THE INVENTION

Certain amine salts have been found to be unexpectedly effective as corrosion inhibitors for tin-plated steel aerosol cans. The structures of these amine salts are:

(1) $C_3$ to $C_{14}$ alkyl amine salts of N-acyl sarcosine, where the acyl radical may be derived from coconut acids, lauric acid, oleic acid or mixtures thereof. The amines used may be isopropylamine, cyclohexylamine, morpholine, 2-ethylhexylamine and a tertiary alkyl primary amine such as Primene 81-R (branched $C_{12-14}$ alkyl primary amine sold by Rohm and Haas Company).

(2) $C_4$ to $C_{22}$ alkyl amine salts of benzoic or oleic acid where the amine used may be 2-ethylhexylamine, tertiary $C_{12-14}$ alkyl primary amine or tertiary $C_{18-22}$ alkyl primary amine. The amines used may also be cyclohexylamine and morpholine.

(3) Salts of polyamines such as N-tallow-1,3-diaminopropane and oleic acid.

(4) Salts of imidazolines such as 1-(2-hydroxyethyl) 2-tall oil-2-imidazoline and oleic acid.

By "tertiary alkyl" is meant that one carbon atom is bonded to three other carbon atoms.

By the term "coconut acids" is meant mixtures of $C_8$ to $C_{18}$ saturated fatty acids in which the $C_{12}$ acid fraction predominates. Also included are unsaturated acids such as oleic acid. The use of the term "coconut acids" is intended to include each component acid either alone or in mixture with other coconut acids which may occur in the technical or commercial grade of coconut acids. The individual acids may be derived from sources other than coconut oil, particularly when these individual acids are present in coconut oil in such small quantities that their isolation would be economically unattractive.

Even though tin-plated, steel aerosol cans may have steel surfaces which are subject to corrosive attack. The steel may be exposed because the tin plate is applied nonuniformly and/or may have porosity as applied. The seams which connect the sides, bottoms, and dome sections of the aerosol cans together often have unplated surfaces. In addition, the aerosol formulation may cause detinning of the tin-plate and thereby expose the underlying steel surface.

It is believed that the subject amine salts prevent corrosion of these exposed steel surfaces and/or detinning of the tin-plate itself by forming protective films in both the vapor and liquid phases. Certain of the subject amines, such as isopropylamine, cyclohexylamine and morpholine salts have unusual volatility and provide very good vapor phase corrosion protection as well as functioning as effective liquid phase rust inhibitors.

The subject amine salts can be used with a variety of propellants. Because they are essentially neutral compounds with respect to pH, they can be used with propellants such as FC-22 which is readily hydrolyzed at pH values above 8. In addition, the subject amine salts can be used with DME, which is particularly compatible with water. DME can be used either alone or in combination with other well known aerosol propellants such as: monochlorodifluoromethane (FC-22), 1-chloro-1,1-difluoroethane (FC-142b), 1,1-difluoroethane (FC-152a); hydrocarbons such as butane, isobutane and propane; compressed gases such as $CO_2$ and nitrogen; and mixtures of these propellants. The corrosion inhibitor compositions of this invention can be used in aerosols containing any of these propellants or combinations thereof.

The corrosion inhibitor compositions of this invention can usually be prepared by using commercially available materials. The corrosion inhibitor, the commercial designation and source for various of these compositions are shown later.

The effective concentration range of the subject corrosion inhibitor compositions is generally 0.1 to 1 wt. % based on the combined total weight of the propellant(s), the weight of the other ingredients and the corrosion inhibitor. A preferred weight range is 0.25 to 0.5 wt. % of the aerosol formulation.

The corrosion inhibitor compositions can be added to the aerosol system in different ways. They can either be added alone or mixed with other ingredients prior to introduction into the aerosol container. If preferred, they can also be combined with the propellant(s) first and subsequently this combination can be added to the aerosol container using well known techniques. This is a particularly convenient way to incorporate the inhibitor into the final aerosol formulation. For example, the subject amine salts are all soluble in DME and DME/FC-22 blends. Such solubility permits the DME or DME-blended propellant to be supplied to the aerosol formulator or loader with the corrosion inhibition composition already present. When combined with the propellant, the amount of corrosion inhibitor composition can be selected to provide the desired 0.1 to 1 wt. % of corrosion inhibitor composition in the final aerosol composition. U.S. Pat. No. 4,315,910 discloses methods for preparing and adding aerosol formulations and propellants to aerosol containers, which is hereby incorporated by reference.

The composition of the aqueous aerosol dispersible media which is, in essence, the formulation containing the active ingredients, will, quite naturally, depend upon the use for which the aerosol is designed. Such formulations are well known to persons skilled in the art, and the choice of formulation is not critical to the use of the invention so long as the medium is compatible with the components of the inhibitor composition. The use of the corrosion inhibitors in tin-plated cans with dry-type antiperspirants containing aluminum chlorohydrate is not recommended. Lined cans should be used in these instances.

It is common practice in the aerosol industry to evaluate corrosion inhibitors in accelerated aging tests. Thus, corrosion test data developed for aerosol cans of representative product formulations exposed to temperatures of 100°-120° F. have been found, through experience, to correlate well with the shelf-life of commercial products. Thus, 60-day tests at 120° F. which have been conducted for the subject corrosion inhibitors are expected to correlate well with actual product storage in stores, warehouses, etc.

EXAMPLES

Sixty-day corrosion tests at 120° F. (48.9° C.) were run on the corrosion inhibitors in four aerosol formulations. These formulations were selected as being representative of commercial products, in their chemical compositions. Distilled water was used in each of the formulations because it was readily available in the laboratory. However, similar results would be expected with deionized water which is often used in commercial aerosols.

Formulations

| Components | Wt. % |
|---|---|
| #1 Insecticide (pH = 6) | |
| Pyrocide 175[a] | 1.50 |
| Piperonyl butoxide | 0.65 |
| "Witconol" 14[b] | 0.97 |
| Ethanol (SDA-40-1) | 10.01 |
| Water (distilled) | 51.87 |
| Dimethyl ether | 35.00 |

[a]Technical grade of natural pyrethrins (McLaughlin Gormley King Company)
[b]Polyglyceryl fatty acid ester surfactant (Witco Chemical Corp.).

| #2 Insecticide (pH = 5) | |
|---|---|
| Dursban[a] | 0.98 |
| Pyrocide 175 | 0.06 |
| Piperonyl butoxide | 0.13 |
| MGK 264[b] | 0.20 |
| Water (distilled) | 63.63 |
| Dimethyl ether | 35.00 |

[a]Phosphorothioic acid 0,0-diethyl o-(3,5,5-trichloro-2-pyridinyl) ester (Dow Chemical Co.).
[b]Insecticide synergist (McLaughlin Gormley King Company), N-octyl bicycloheptane dicarboximide.

| #3 Room Freshener (pH = 6) | |
|---|---|
| Fragrance[a] | 1.40 |
| Ethanol (SDA-40-1) | 19.60 |
| Water (distilled) | 49.00 |
| Dimethyl ether | 30.00 |

[a]Commercially available Rose Fragrance.

| #4 Insecticide (pH = 5) | |
|---|---|
| Dursban | 0.98 |
| Pyrocide 175 | 0.06 |
| Piperonyl butoxide | 0.13 |
| MGK 264 | 0.20 |
| Water distilled | 63.63 |
| FC-22 | 14.00 |
| Dimethyl ether | 21.00 |

Procedure

All of the examples were prepared using the following procedure. The active ingredients were weighed individually into an eight-ounce three-piece aerosol can 2⅛" in diameter and 5 9/16" long, except when the corrosion inhibitors were added to the aerosol can as a solution in the propellant (noted in tables). The can was purged with dichlorodifluoromethane (FC-12) vapor to displace the air in the container. The aerosol can valve was then placed into the can and crimped. The propellants were introduced into the can as liquids through the aerosol valve. Volume amounts corresponding to the weights of the propellants were calculated prior to loading, and a glass, calibrated, pressure buret was used to measure and transfer the liquids from storage cylinders to the can. A nitrogen gas pressure of 100 psig was applied to the buret to aid in transferring the liquids from the buret to the can. After the propellant was loaded, the can was weighed, and the weight of propellant recorded.

The aerosol cans used in the corrosion tests were commercially available containers and are described in trade literature as: one inch round dome top unlined aerosol containers, size 202×509 (2 1/8" diameter, 5 9/16" can wall height), 0.25 lb. electrolytic tin-plated (ETP), full concave bottom with welded side seam.

A corrosion test rating system was used which provides a complete visual description of the appearance of the interior surface of the tin-plated steel aerosol cans after 60 days storage at 120° F.

| CAN CORROSION - RATING SYSTEM | |
|---|---|
| Rating* | Description |
| 0 | No Corrosion |
| 1 | Trace Corrosion |
| 2 | Light Corrosion |
| 3 | Moderate Corrosion |
| 4 | Heavy Corrosion |
| 5 | Severe Corrosion |

*This numerical rating is an overall assessment of the total can (tin-plate, joints and side seams) and represents the primary rating of a test. A rating of 0–2 is considered effective and 3 or greater is a failed rating. Therefore, an effective amount of corrosion inhibiting composition in an aerosol formulation is the amount which is necessary to prevent more than light corrosion of the interior of a tin-plated steel can which contains an aqueous-based aerosol formulation, a propellant, and the corrosion inhibiting composition.

| MATERIALS USED IN PREPARATION OF CORROSION INHIBITORS | |
|---|---|
| Material | Designation and Source |
| Tertiary $C_{12-14}$ alkyl primary amine | Primene 81-R (Rohm and Haas Co.) |
| Tertiary $C_{18-22}$ alkyl primary amine | Primene JM-T (Rohm and Haas Co.) |
| N-oleyl sarcosine | Sarkosyl O (Ciba-Geigy Corp.) |
| N-lauroyl sarcosine | Sarkosyl L (Ciba-Geigy Corp.) |
| N-Cocoyl sarcosine | Sarkosyl LC (Ciba-Geigy Corp.) |
| Sodium N-oleyl sarcosinate | from Sarkosyl O (Ciba-Geigy Corp.) |
| Sodium N-cocoyl sarcosinate | from Sarkoysl LC (Ciba-Geigy Corp.) |
| Triethanolamine N-oleyl/cocoyl (70/30) sarcosinate | Hamposyl TOC-30 (W. R. Grace & Co.) |
| 2-Ethylhexylamine | Pfaltz and Bauer, Inc. |
| Morpholine | Pfaltz and Bauer, Inc. |
| Isopropylamine | Aldrich Chemical Company |
| Cyclohexylamine | Aldrich Chemical Company |
| Benzoic acid | Fisher Scientific Company |
| Oleic Acid | Fisher Scientific Company |
| N-tallow-1,3-diaminopropane dioleate | Duomeen TDO (Armak Company) |
| 1-(2-Hydroxyethyl)-2-tall oil-2-imidazoline oleate | Witcamine PA-78B (Witco Chemical) |

TABLE I
CORROSION TEST DATA
Corrosion Test Procedure - 60 days at 120° F.
Corrosion Test Medium - Formulation #1

| Corrosion Inhibitor | Wt. % | Test Rating | Description of Test Can Corrosion |
|---|---|---|---|
| None | — | 5 | Bottom detinned; rust on walls; vapor phase corrosion |
| Primene 81-R salt of Sarkosyl L | 0.50 | 2 | Light vapor phase corrosion |
| Primene 81-R salt of Sarkosyl LC | 0.10 | 5 | Similar to control |
| Primene 81-R salt of Sarkosyl LC | 0.25 | 2 | Light vapor phase corrosion |
| Primene 81-R salt of Sarkosyl LC | 0.50 | 2 | Light vapor phase corrosion |
| Primene 81-R salt of Sarkosyl O | 0.10 | 5 | Similar to control |
| Primene 81-R salt of Sarkosyl O | 0.25 | 2 | Light vapor phase corrosion |
| Primene 81-R salt of Sarkosyl O | 0.50 | 2 | Light vapor phase corrosion |
| Morpholine salt of Sarkosyl O | 0.50 | 1 | Slight liquid phase corrosion |
| Morpholine salt of Sarkosyl O | $0.50^a$ | 1 | Slight liquid phase corrosion |
| Morpholine salt of Sarkosyl O | 0.50 | 1 | Slight corrosion in liquid |
| Cyclohexylamine salt of benzoic acid | 0.50 | 1 | Slight corrosion in liquid |
| Witcamine PA-78 B | 0.50 | 1 | Slight corrosion in vapor |
| Duomeen TDO | 0.50 | 2 | Light corrosion in vapor |
| Primene 81-R salt of oleic acid | 0.10 | 5 | Similar to control |
| Primene 81-R salt in of oleic acid | 0.25 | 3 | Moderate corrosion in vapor |
| Primene 81-R salt of oleic acid | 0.50 | 2 | Light corrosion in in vapor |
| Morpholine acetate | 0.50 | 2 | Light corrosion in liquid |
| Morpholine oleat | 0.50 | 1 | Slight corrosion in liquid |
| Cyclohexylamine salt of oleic acid | 0.50 | 1 | Slight corrosion in liquid |
| Isopropylamine salt of oleic acid | 0.50 | 1 | Slight corrosion in liquid |
| Isopropylamine salt of Sarkosyl O | 0.50 | 2 | Light liquid phase corrosion |
| 2-Ethylhexylamine salt of Sarkosyl O | 0.10 | 3 | Moderate vapor phase corrosion |
| 2-Ethylhexylamine salt of Sarkosyl O | 0.25 | 2 | Light vapor phase corrosion |
| 2-Ethylhexylamine salt of Sarkosyl O | 0.50 | 2 | Light vapor phase corrosion |
| Cyclohexylamine salt of Sarkosyl O | 0.50 | 1 | Slight liquid phase corrosion |
| Primene 81-R salt of benzoic acid | 0.10 | 3 | Moderate vapor phase corrosion |
| Primene 81-R salt of benzoic acid | 0.25 | 2 | Light vapor phase corrosion |
| Primene 81-R salt of benzoic acid | 0.50 | 2 | Light vapor phase corrosion |
| Primene JM-T salt of benzoic acid | 0.50 | 2 | Light vapor phase corrosion |
| 2-Ethylhexylamine salt of benzoic acid | 0.10 | 3 | Moderate vapor phase corrosion |
| 2-Ethylhexylamine salt of benzoic acid | 0.25 | 2 | Light vapor phase corrosion |
| 2-Ethylhexylamine salt of benzoic acid | 0.50 | 1 | Slight vapor phase corrosion |

$^a$Corrosion inhibitor added with propellant solution to aerosol can.

As can be seen from Table I, in each case the addition of an effective amount of corrosion inhibitor prevented more than light corrosion of the interior of the test can with Formulation No. 1. Specifically, more than 0.10 wt. % of Primene 81-R salt of Sarkosyl LC, Primene 81-R salt of Sarkosyl 0, Primene 81-R salt of oleic acid, 2-ethylhexylamine salt of Sarkosyl 0, Primene 81-R salt of benzoic acid, and 2-ethylhexylamine salt of benzoic acid was needed, but increased quantities provided effective corrosion inhibition.

TABLE II

CORROSION TEST DATA
Corrosion Test Procedure - 60 days at 120° F.
Corrosion Test Medium - Formulation #2

| Corrosion Inhibitor | Wt. % | Test Rating | Description of Test Can Corrosion |
|---|---|---|---|
| None | — | 5 | Severe corrosion in liquid and vapor phases |
| Primene 81-R salt of Sarkosyl O | 0.50 | 2 | Light vapor phase corrosion |
| Primene 81-R salt of benzoic acid | 0.50 | 2 | Light vapor phase corrosion |
| Morpholine salt of benzoic acid | 0.50 | 1 | Slight liquid phase corrosion |
| Morpholine salt of oleic acid | 0.50 | 1 | Slight liquid phase corrosion |
| Duomeen TDO | 0.50 | 2 | Light vapor phase corrosion |
| Duomeen TDO | 0.50[a] | 2 | Light vapor phase corrosion |

[a]Corrosion inhibitor added to aerosol can with propellant solution

As can be seen from Table II, in each case the addition of 0.50 wt. % of corrosion inhibitor prevented more than light corrosion of the interior of the test can with Formulation #2.

TABLE III

CORROSION TEST DATA
Corrosion Test Procedure - 60 days at 120° F.
Corrosion Test Medium - Formulation #3

| Corrosion Inhibitor | Wt. % | Test Rating | Description of Test Can Corrosion |
|---|---|---|---|
| None | — | 5 | Bottom detinned; corrosion and detinning in vapor phase |
| Primene 81-R salt of Sarkosyl O | 0.50 | 2 | Light vapor phasee corrosion |
| Primene 81-R salt of benzoic acid | 0.50 | 1 | Slight vapor phase corrosion |
| Morpholine oleate | 0.50 | 1 | Slight liquid phase corrosion |
| Witcamine PA-78B | 0.50 | 1 | Slight vapor phase corrosion |
| Duomeen TDO | 0.50 | 2 | Slight vapor phase corrosion |

As can be seen from Table III, in each case the addition of 0.50 wt. % of the corrosion inhibitor prevented more than light corrosion of the interior of the test can with Formulation No. 3.

TABLE IV

CORROSION TEST DATA
Corrosion Test Procedure - 60 days at 120° F.
Corrosion Test Medium - Formulation #4

| Corrosion Inhibitor | Wt. % | Test Rating | Description of Test Can Corrosion |
|---|---|---|---|
| None | — | 5 | Severe corrosion in liquid and vapor |
| Primene 81-R salt of Sarkosyl O | 0.50 | 2 | Light vapor phase corrosion |
| Primene 81-R salt of benzoic acid | 0.50 | 2 | Light vapor phase corrosion |
| Morpholine salt of benzoic acid | 0.50 | 0 | No corrosion |
| Morpholine salt of oleic acid | 0.50 | 1 | Slight corrosion in liquid |

As can be seen from Table IV, in each case the addition of 0.50 wt. % of corrosion inhibitor prevented more than light corrosion of the interior of the test can with Formulation No. 4.

I claim:
1. A process of inhibiting corrosion in a tin-plated steel aerosol can containing an aqueous aerosol formulation and a propellant comprising contacting the aqueous aerosol formulation, the propellant and an effective amount of a compound selected from the group consisting of $C_4$ to $C_{22}$ alkyl amine salts of oleic acid, and salts of polyamines and oleic acid, and salts of imidazolines and oleic acid with the interior of a tin-plated steel aerosol can.

2. The process of claim 1 wherein the compound is present in an amount between 0.1 to 1.0 wt. % based on the total weight of the aqueous aerosol formulation and the propellant.

3. The process of claim 2 wherein the compound is present in an amount between 0.25 to 0.5 wt. % based on the total weight of the aqueous aerosol formulation and the propellant.

4. The process of claim 1 wherein the polyamine is N-tallow-1,3-diaminopropane.

5. The process of claim 4 wherein the compound is present in an amount between 0.1 to 1.0 wt. % based on the total weight of the aqueous aerosol formulation and the propellant.

6. The process of claim 5 wherein the compound is present in an amount between 0.25 to 0.5 wt. % based on the total weight of the aqueous aerosol formulation and the propellant.

7. The process of claim 1 wherein the imidazoline is 1-(2-hydroxyethyl)2-tall oil-2-imidazoline.

8. The process of claim 7 wherein the compound is present in an amount between 0.1 to 1.0 wt. % based on the total weight of the aqueous aerosol formulation and the propellant.

9. The process of claim 8 wherein the compound is present in an amount between 0.25 to 0.5 wt. % based on the total weight of the aqueous aerosol formulation and the propellant.

* * * * *